3,144,486
PROCESS FOR THE PRODUCTION OF SYMMETRICAL DIALKYL HYDRAZINES
Hans-Joachim Abendroth, Leverkusen, Germany, assignor to Farbenfabriken Bayer Aktiengesellschaft, Leverkusen, Germany, a corporation of Germany
No Drawing. Filed Dec. 19, 1960, Ser. No. 76,492
Claims priority, application Germany Dec. 23, 1959
2 Claims. (Cl. 260—583)

The present invention relates to an improved process for the production of symmetrical dialkyl hydrazines.

Whereas the reaction of monochloramine with dialkylamine in aqueous solution is a process capable of being used for the production of asymmetrical dialkyl hydrazines, the analogous reaction between alkyl chloramines and monoalkylamine only results in uneconomically small yields of symmetrical dialkyl hydrazines.

It is known to obtain symmetrical dialkyl hydrazines by alkylating symmetrical diacyl hydrazines and subsequently hydrolyzing with hydrochloric acid.

It is also known to prepare symmetrical dialkyl hydrazines by hydrogenating the corresponding azines. It is also possible to prepare alkyl chloramine in a gaseous reaction from monoalkylamine and chlorine and to transform the alkyl chloramine with the anhydrous alkylamine, under elevated pressure, into symmetrical dialkyl hydrazine.

However, these processes only lead to the required products by using expensive starting materials and/or by employing complicated processing steps.

The present invention is concerned with an economic process for the production of symmetrical dialkyl hydrazines and consists in that, in a gaseous reaction, chlorine is reacted with excess monoalkylamine and a carbonyl compound (ketone or aldehyde) to form a diaziridine (I) (Equation 1), which reacts with aqueous mineral acid, for example sulphuric acid, with reformation of the carbonyl compound, to yield a symmetrical dialkyl hydrazonium salt (Equation 2). This latter can be transformed in known manner into the free base, for example by reaction with caustic alkalis.

(1)
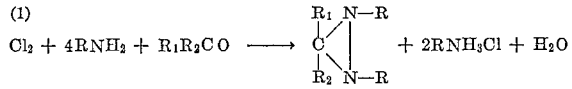

$R_1$=an alkyl or aryl radical
$R_2$=an alkyl or aryl radical or a hydrogen atom
$R$=an alkyl radical e.g.
$R_1$, $R_2$ and $R_3$=methyl radicals
or
$R_1$ and $R_2$=methyl radicals
$R$=an ethyl radical (2)
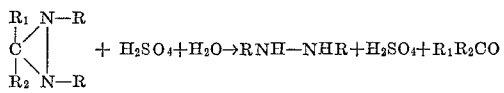

In detail, the process of the invention is so carried out that excess gaseous monoalkylamine is charged with the vapour of a ketone or an aldehyde and is reacted in a suitable reactor with gaseous chlorine. It is advantageous to work at normal pressure, but reduced pressure can also be used if the boiling point of the amine concerned makes this necessary.

It is consequently possible to use the synthesis on all monoalkylamines which have boiling points between those of the monomethylamine and of the benzylamine.

The invention relates more especially to the synthesis of those symmetrical dialkyl hydrazines which are derived from the low aliphatic amines, such as from methylamine, ethylamine, i-propylamine, n-propylamine, tertiary butylamine, secondary butylamine and primary-n-butylamine. The amine is used in excess relative to the chlorine and advantageously 30 to 60 mols of amine are employed per mol of chlorine. Mainly to be considered as carbonyl compounds are acetone, methylethyl ketone, diethyl ketone, methylisopropyl ketone, methylpropyl ketone, ethyl propyl ketone, methylbutyl ketone, cyclohexanone, acetaldehyde, propionaldehyde, butyraldehyde or benzaldehyde. The upper limit of the quantity of carbonyl compound to be used is defined by the reaction conditions (pressure and temperature) and the vapour pressure of the carbonyl compound in question, but at least 2 mols of carbonyl compound should be used per mol of chlorine. Advantageously 5–30 mols of carbonyl chloride are employed per mol of chlorine.

It is advantageous to dilute the reaction mixture with an inert gas, preferably nitrogen, for example with 1 mol per mol of amine; however, other proportions in the mixture can be used.

Advantageously, the reaction temperature is between +40 and +100° C. With good insulation of the reaction vessel, the temperature will automatically adjust itself in most cases. Alternatively, the gases or the reaction vessel can be preheated.

A mixture of diaziridine and carbonyl compound in vapour form, excess gaseous amine, perhaps inert gas, steam and alkyl ammonium chloride in dust form leaves the reactor. One possibility of working up this mixture consists in separating the alkylammonium chloride by means of a mechanical filter or an electrofilter. The condensable constituents of the remaining gas mixture are liquefied and the diaziridine is obtained by rectifying the liquid mixture. While avoiding liquefaction, the diaziridine can be isolated from the gas mixture by selective adsorption, for example on silica gel.

Another possibility is that the gas mixture from which the alkylammonium chloride has been filtered, is washed with water. In order to avoid undesired heating, it is better to use an aqueous solution of the amine concerned instead of water. From the solution thus obtained, the amine and the carbonyl compound can easily be separated from the diaziridine because of differences in boiling point.

The reaction mixture can moreover be worked up very conveniently by washing it with aqueous alkylamine solution without having previously separated out the alkyl ammonium chloride. The solution formed is mixed with a quantity of caustic alkali equivalent to the quantity of chloride ions contained therein and then rectified, preferably at reduced pressure. The amine initially combined with the chlorine thus becomes available again for the synthesis. A modification of this working procedure comprises liberating the reaction mixture from the alkyl ammonium chloride by passing the mixture through boiling caustic alkali solution prior to the washing process. The diaziridine recovered in this way can be split into the symmetrical dialkyl hydrazonium salt and the free carbonyl compound by heating with aqueous mineral acid, as is also known in connection with the normal hydrazones, the isomers of diaziridines.

For the purpose of again using the amine used in excess in the synthesis and the carbonyl compound, which is likewise used in excess, it is advisable to conduct the amine, perhaps inert gas and the carbonyl compound in circulation. Chlorine gas and the fractions of amine and carbonyl compound, which are withdrawn from the circulation by the reaction and the working up of the reaction mixture, are continuously supplied to such circulation. The demand for amine and carbonyl compound is partly covered by fractions which form with the isolation of the diaziridine and the hydrolysis thereof.

Symmetrical dialkyl hydrazines can be used as starting materials for organic syntheses.

*Example 1*

A mixture of 50 mol/h. of monomethylamine, 50 mol/h. of nitrogen and 6 mol/h. of acetone vapour is combined with 1 mol/h. of chlorine. By heating the vessel, a reaction temperature of about 70° C. is obtained. The reaction mixture freed by filtration from 2 mols/h. of methyl ammonium chloride is washed with cold water which is saturated with methylamine. After evaporating the methylamine and concurrently dissolved acetone, 0.49 mol/h. of tetramethyl diaziridine is obtained in substantially 20% aqueous solution. It is possible from this to obtain 0.49 mol/h. of symmetrical dimethyl hydrazinium sulphate, for example with sulphuric acid, this corresponding to a yield of 49.0%, related to the chlorine introduced.

*Example 2*

A mixture of 50 mol/h. of monomethylamine, 50 mol/h. of nitrogen and 20 mol/h. of acetone vapour is combined with 1 mol/h. of chlorine. A reaction temperature of about 50° C. is obtained without heating. The entire reaction mixture, including the ethyl ammonium chloride in powder form, is introduced into boiling substantially 10% sodium hydroxide solution. The chloride-free gas mixture escaping from the latter is washed with a cold, aqueous ethylamine solution, which takes up 0.60 mol/h. of 1,2-diethyl-3,3-dimethyl diaziridine. After driving off the ethylamine and concurrently dissolved acetone, 0.60 mol/h. of symmetrical diethyl hydrazinium sulphate is recovered from this solution, for example with sulphuric acid, the yield of such sulphate being 60%, related to the chlorine introduced.

I claim:

1. In a process for the production of symmetrical dialkyl hydrazines, the steps which comprise reacting in the gas phase at a temperature between 40° C. and 100° C. gaseous chlorine with primary amines in vapor form in a proportion of from 30 to 60 mols per each mol of chlorine, said amine being selected from the group consisting of monomethylamine, monoethylamine, monopropylamine and monobutylamine, and carbonyl compounds in vapor form in a proportion of from 2 to 30 mols per each mol of chlorine, said carbonyl compounds being selected from the group consisting of acetone, methylethyl, ketone, diethyl ketone, methyl isopropyl ketone, methyl propyl ketone, ethyl propyl ketone, methyl butyl ketone, cyclohexanone, acetaldehyde, propionaldehyde, butyraldehyde and benzaldehyde, to thereby form diaziridines, recovering the diaziridines in the form of an aqueous solution from the reaction mixture, adding thereto an aqueous mineral acid to thereby convert the diaziridines into said initially employed carbonyl compounds and symmetrical dialkyl hydrazinium salts, and recovering said symmetrical dialkyl hydrazinium salts in the form of free symmetrical dialkyl hydrazines from the reaction mixture.

2. Process according to claim 1 in which the first reaction step is carried out in the presence of an inert gas as diluent.

References Cited in the file of this patent

UNITED STATES PATENTS 2,808,439    Barrett et al. _____ Oct. 1, 1957

FOREIGN PATENTS

55B    Belgium _____ 1959

OTHER REFERENCES

Byrkit et al.: Industrial and Engineering Chemistry, vol. 42 (1950).